(12) United States Patent
Yacoub et al.

(10) Patent No.: US 8,548,267 B1
(45) Date of Patent: Oct. 1, 2013

(54) PROCESSING A DIGITAL IMAGE OF CONTENT USING CONTENT AWARE DESPECKLING

(75) Inventors: Sherif M. Yacoub, Seattle, WA (US); Jian Liang, Seattle, WA (US); Hanning Zhou, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 985 days.

(21) Appl. No.: 11/864,187

(22) Filed: Sep. 28, 2007

(51) Int. Cl.
*G06K 9/40* (2006.01)
*G06K 9/34* (2006.01)
*H04N 1/00* (2006.01)

(52) U.S. Cl.
USPC ........... 382/275; 382/112; 382/176; 382/180; 382/260; 382/261; 358/2.1

(58) Field of Classification Search
USPC ................. 382/275, 112, 176, 180, 260, 261; 358/2.1
See application file for complete search history.

(56) References Cited

U.S. PATENT DOCUMENTS

| | | | | |
|---|---|---|---|---|
| 5,848,184 A * | 12/1998 | Taylor et al. | ........ | 382/173 |
| 6,400,845 B1 * | 6/2002 | Volino | ........ | 382/176 |
| 6,507,670 B1 * | 1/2003 | Moed | ........ | 382/172 |
| 6,976,223 B1 * | 12/2005 | Nitschke | ........ | 715/764 |
| 6,993,185 B2 * | 1/2006 | Guo et al. | ........ | 382/176 |
| 7,031,543 B2 * | 4/2006 | Cheng et al. | ........ | 382/254 |
| 7,337,399 B2 * | 2/2008 | Jensen et al. | ........ | 715/255 |
| 7,505,632 B2 * | 3/2009 | Hu et al. | ........ | 382/275 |
| 7,529,407 B2 * | 5/2009 | Marquering et al. | ........ | 382/176 |
| 7,557,963 B2 * | 7/2009 | Bhattacharjya | ........ | 358/3.27 |
| 7,773,803 B2 * | 8/2010 | Fan | ........ | 382/164 |
| 2002/0118889 A1 * | 8/2002 | Shimizu | ........ | 382/274 |
| 2003/0118234 A1 * | 6/2003 | Tanaka et al. | ........ | 382/173 |
| 2005/0163374 A1 * | 7/2005 | Ferman et al. | ........ | 382/176 |
| 2006/0126093 A1 * | 6/2006 | Fedorovskaya et al. | ........ | 358/1.14 |
| 2007/0074108 A1 * | 3/2007 | Xie et al. | ........ | 715/517 |
| 2009/0022397 A1 * | 1/2009 | Nicholson | ........ | 382/180 |

FOREIGN PATENT DOCUMENTS

| | | |
|---|---|---|
| DE | 4311172 | 10/1993 |
| WO | WO2007/065087 | 6/2007 |

OTHER PUBLICATIONS

Aiazzi, et al. "Multiresolution Adaptive Speckle Filtering: a Comparison of Algorithms." Geoscience and Remote Sensing, 1997. IGARSS '97. Remote Sensing—A Scientific Vision for Sustainable Development., 1997 IEEE International . 2. (1057-1056): 1997. Print.*

(Continued)

*Primary Examiner* — Michael A Newman
(74) *Attorney, Agent, or Firm* — Thomas|Horstemeyer, LLP

(57) ABSTRACT

Systems and methods for removing artifacts from a page of digital image are presented. More particularly, a digital image is obtained, the digital image having at least one page of content to be processed. A content bounding box is determined for the content of the page. Additionally, a set of segments is generating, the set corresponding to particular areas of the content within the content bounding box, each area associated with a type of content. For each segment of the set of segments, the following are performed. Despeckling criteria are selected for identifying artifacts according to the type associated with the segment. Artifacts are identified in the segment according to the despeckling criteria. The identified artifacts are then removed from the page. Thereafter, the updated digital image is stored in a content store.

19 Claims, 17 Drawing Sheets

(56) References Cited

OTHER PUBLICATIONS

Walessa, et al. "Model-Based Despeckling and Information Extraction from SAR Images." IEEE Transactions on Geoscience and Remote Sensing. 38.5 (2000): 2258-2269. Print.*

Cannon, et al. "Quality Assessment and Restoration of Typewritten Document Images." International Journal on Document Analysis and Recognition. 2. (1999): 80-89. Print.*

Silva et al. "Background Removal of Documents Images Acquired Using Portable Digital Cameras." Lecture Notes in Computer Science, ICIAR 2005. 3656. (2005): 278-285. Print.*

Yin, et al. "Multi-component Document Image Coding Using Regions-of-Interest." Springer Lecture Notes in Computer Science—DAS 2004. 3163. (2004): 158-169. Print.*

European Patent Application No. 08252547.8 Search Report and Written Opinion mailed Apr. 27, 2009, 10 pages.

Fan, J. et al, "A Comprehensive Image Processing Suite for Book Re-mastering," International Conference on Document Analysis and Recognition, Aug. 2005, 5 pages, IEEE, USA.

Baird, H.S., "Difficult and Urgent Open Problems in Document Image Analysis for Libraries," International Workshop on Document Image Analysis for Libraries, Jan. 2004, 8 pages, IEEE, USA.

Le Bourgeois, F. et al., "Document Images Analysis Solutions for Digital Libraries," International Workshop on Document Image Analysis for Libraries, Jan. 2004, 23 pages, IEEE, USA.

Cinque, L. et al., "Segmentation of Page Images Having Artifacts of Photocopying and Scanning," Pattern Recognition Society, May 2002, 11 pages, Elsevier Science Ltd., Great Britain.

* cited by examiner

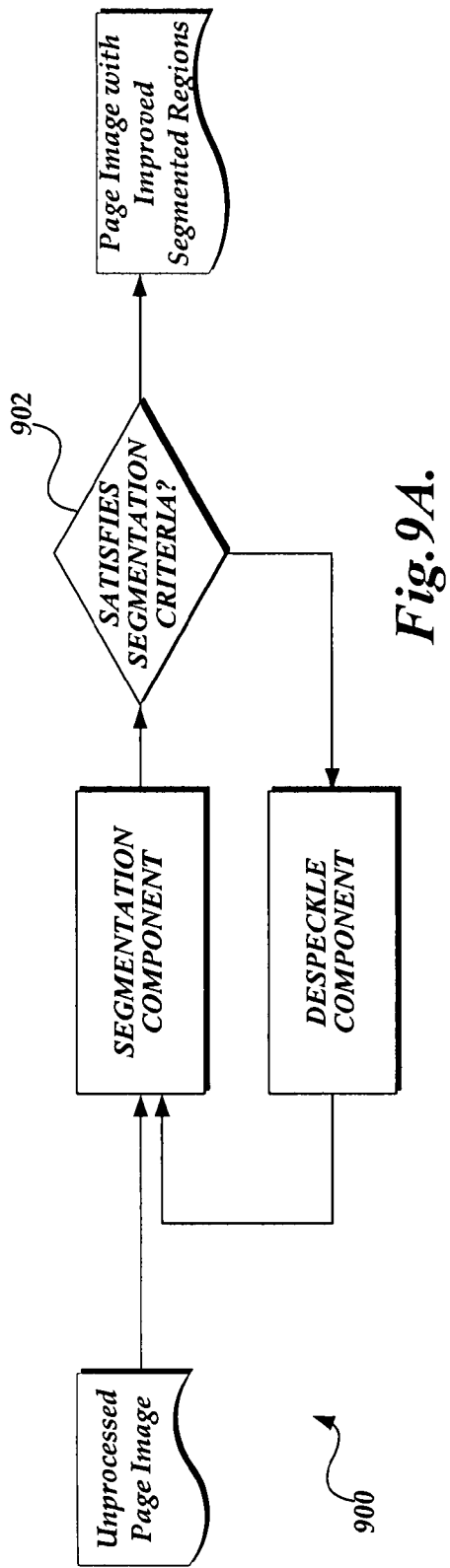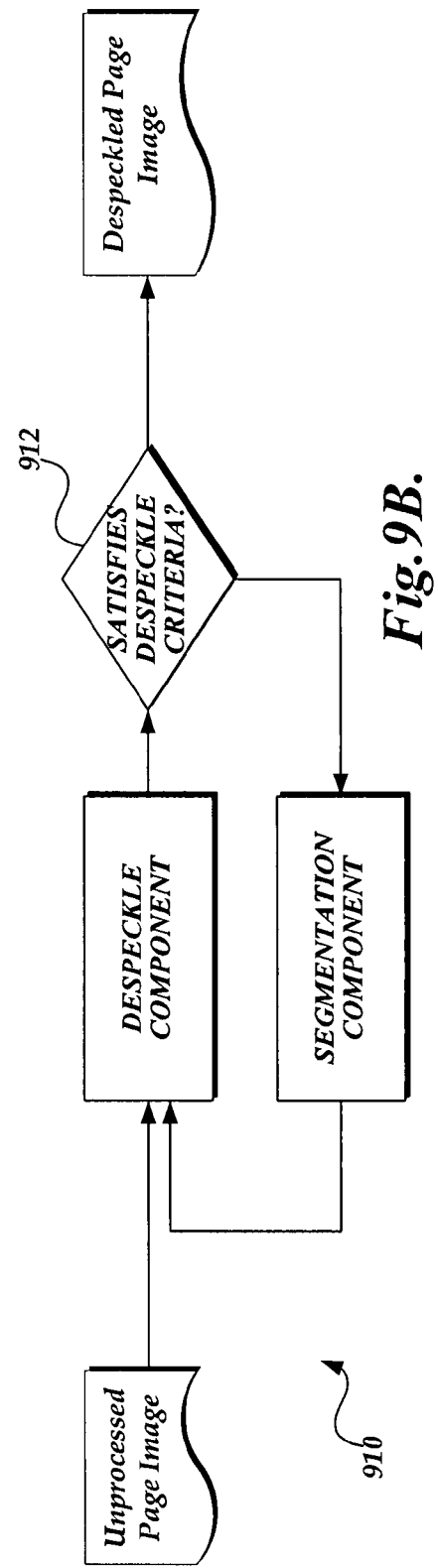
Fig.9A.
Fig.9B.

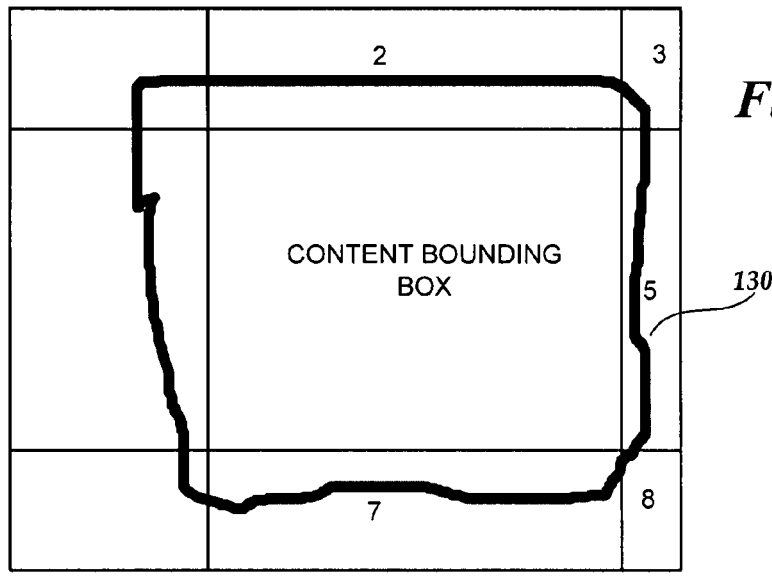
*Fig.13A.*
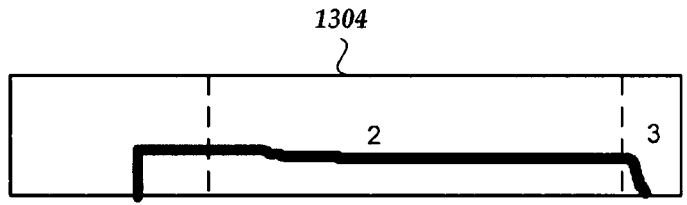
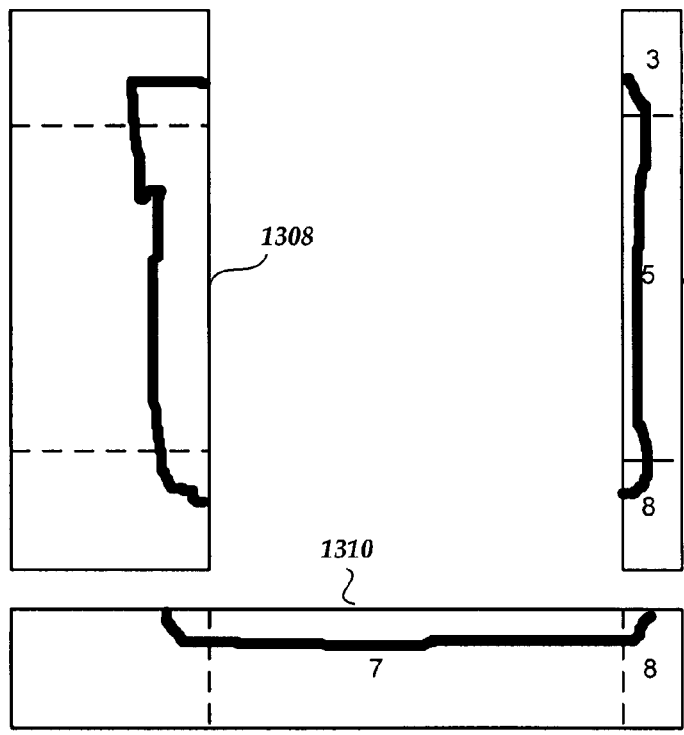
*Fig.13B.*

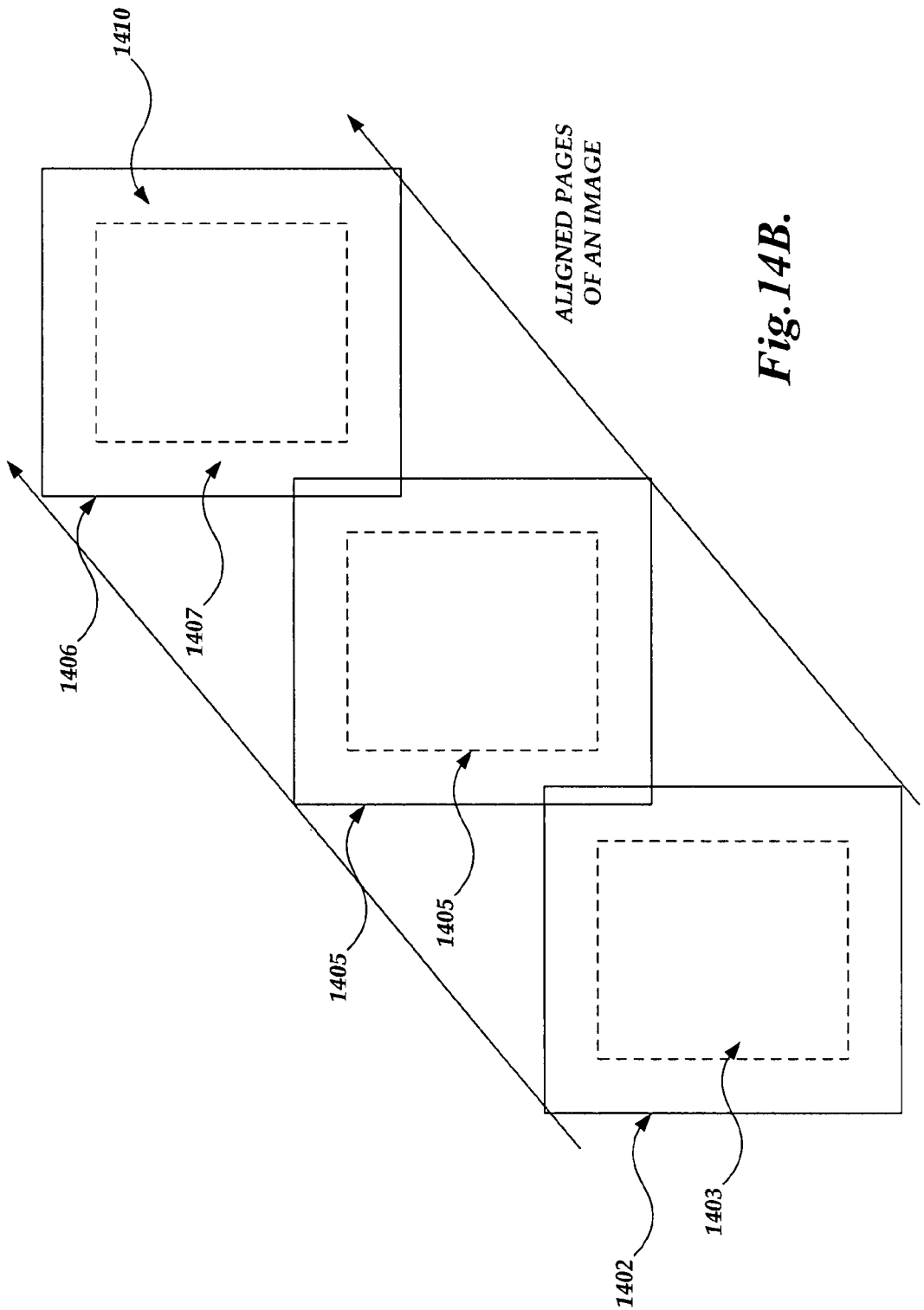

PROCESSING A DIGITAL IMAGE OF CONTENT USING CONTENT AWARE DESPECKLING

CROSS-REFERENCES TO RELATED APPLICATIONS

This application is related to co-pending U.S. patent application Ser. No. 11/864,208, filed Sep. 28, 2007, entitled "Processing a Digital Image of Content." This application is also related to co-pending U.S. patent application Ser. No. 11/864,180, filed Sep. 28, 2007, entitled "Processing a Digital Image of Content to Remove Border Artifacts."

BACKGROUND

The publishing industry has greatly benefited from the many advances in digital imaging and printing technologies. Indeed, one of the many advances has been the creation of an on-demand printing market where a publisher prints small quantities of a book or other publication to satisfy orders for the publication as the orders are made. This is especially advantageous where requests for the publication are sporadic or limited, such that generating a typical print run would not be cost effective. Moreover, on-demand printing proves advantageous when the publisher is not the originator of the publication and has only a printed copy of the publication, since the publisher can scan the pages of the publication, and generate a document therefrom.

Publishers, including on-demand publishers, receive source copies of a publication in a variety of formats, including digital and printed formats. Authors will provide electronic source copies of a document in a particular format using a word processor. This type of document has the advantage that the content is free of extraneous speckles and lines (referred to as "artifacts") that arise when source documents originate from a scanned or photocopied source. For example, FIG. 1 is a digital image 100 of consecutive, facing pages from a book that illustrates the extraneous artifacts, including speckles (102-108) and lines (110-112) that arise for a variety of reasons while scanning, faxing, and/or photocopying printed content. Of course, the artifacts are not part of the content and, if printed as is, create a distraction to a reader and generally suggest that the published book is a cheap imitation of the genuine article. In short, if these pages (and others with similar artifacts) were printed in a book, a customer would likely view the book as entirely unacceptable.

In spite of the fact that many authors could provide publishers with a source copy of content that is free of artifacts, more often than not the source copies have some artifacts that detract from the overall quality of the book when printed in an on-demand manner. Unfortunately, on-demand publishers simply use the source copy provided to them by authors or content aggregators, relying upon them to maintain the source copy artifact-free. Moreover, when the source copy is a printed document (such as a 100-year old book that has long been out of print), even the best scanners and photocopiers frequently include artifacts.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 9A and 9B are pictorial diagrams depicting an iterative segmentation process and despeckling process for generating different outcomes;

FIGS. 13A and 13B shown an illustrative digital image page that depicts cutting areas for removing a border object that encompasses an outermost bounding box of a digital image page;

FIGS. 14A and 14B are block diagrams illustrating multiple pages of a digital image where the content (as represented by the bounding boxes) of the images are misaligned with respect to each other.

DETAILED DESCRIPTION

Techniques, methods, and apparatus are described for processing content into print-ready content suitable for on-demand printing. In particular, FIG. 2 is a pictorial diagram of an illustrative networked environment 200 suitable for processing content into a print-ready state for on-demand printing, according to aspects of the disclosed subject matter.

Figure 2:
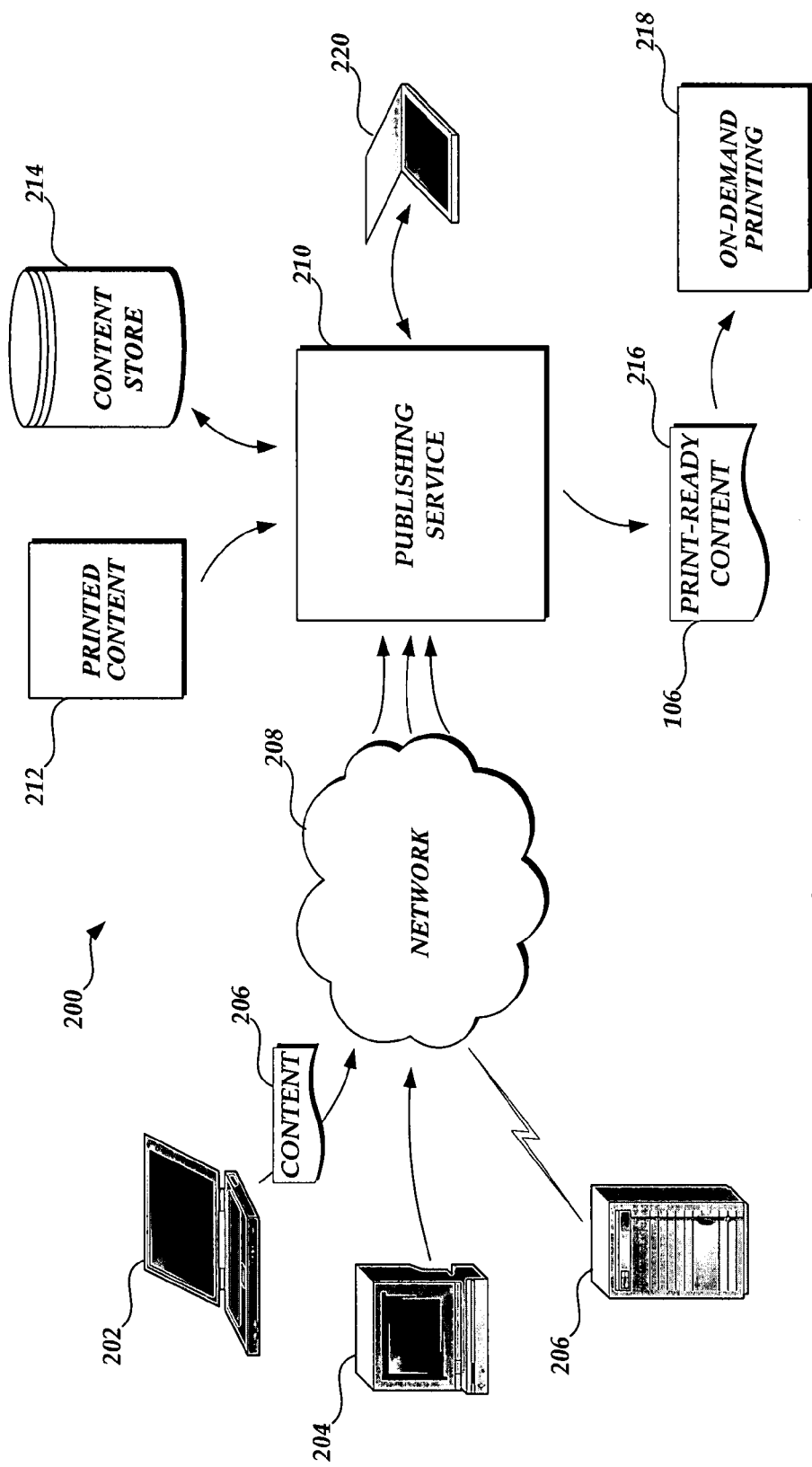
FIG. 2 is a pictorial diagram of an illustrative networked environment suitable for processing content to place the content in a print-ready state.

As shown in FIG. 2, a publishing service 210 is connected via a network 208 to one or more clients, such as clients on computing devices 202-208. Typically, the publishing service receives publication requests from the clients to prepare, if necessary, and publish the requested content in an on-demand fashion. Clients include, but are not limited to, authors, consumers, content vendors, and the like. The client computing devices 202-208 may be connected to the network 208 via a wireless or wired connection.

A request may indicate a particular publication to be printed, such as an out-of-print book, or include the particular content 206 for the publishing service 210 to publish via its on-demand printing services. A given publication request may include the content to be published, or alternatively may identify a publication or other content that is available to the publishing service 210. For example, a client/vendor using computing device 204 may request that the publishing service 210 generate five copies of an out-of-print book 212 or other published, printed document that is available to the publishing service in physical form 212 or of digital content (not shown) stored in a content store 214. Alternatively, a client/author using computing device 202 may supply an original document to the publication service 210 for on-demand printing. Of course, a publication service 210 may also receive physical printed copies of content or digital content on physical media via a physical delivery means with an accompanying request to prepare and print the content.

The publication service 210 will typically have available or include the necessary hardware, such as a scanner 220 or other imaging device, to generate digital images of printed content. To this end, while not shown, the publication service 210 may also include a fax machine that may receive and store a faxed image of content, or print the faxed content for conversion to a digital image.

Once a request is received, and the printed content (if the request is in regard to printed content) is converted to an initial digital image, the publication service 210 processes the image to place it in a condition for on-demand printing. There are typically many aspects to processing an image of printed content for on-demand printing that are performed by the publication service 210. To that end, FIG. 3 is a block diagram of illustrative logical components of a publication service 210 suitable for processing a digital image of content into an on-demand print ready document.

Figure 3:
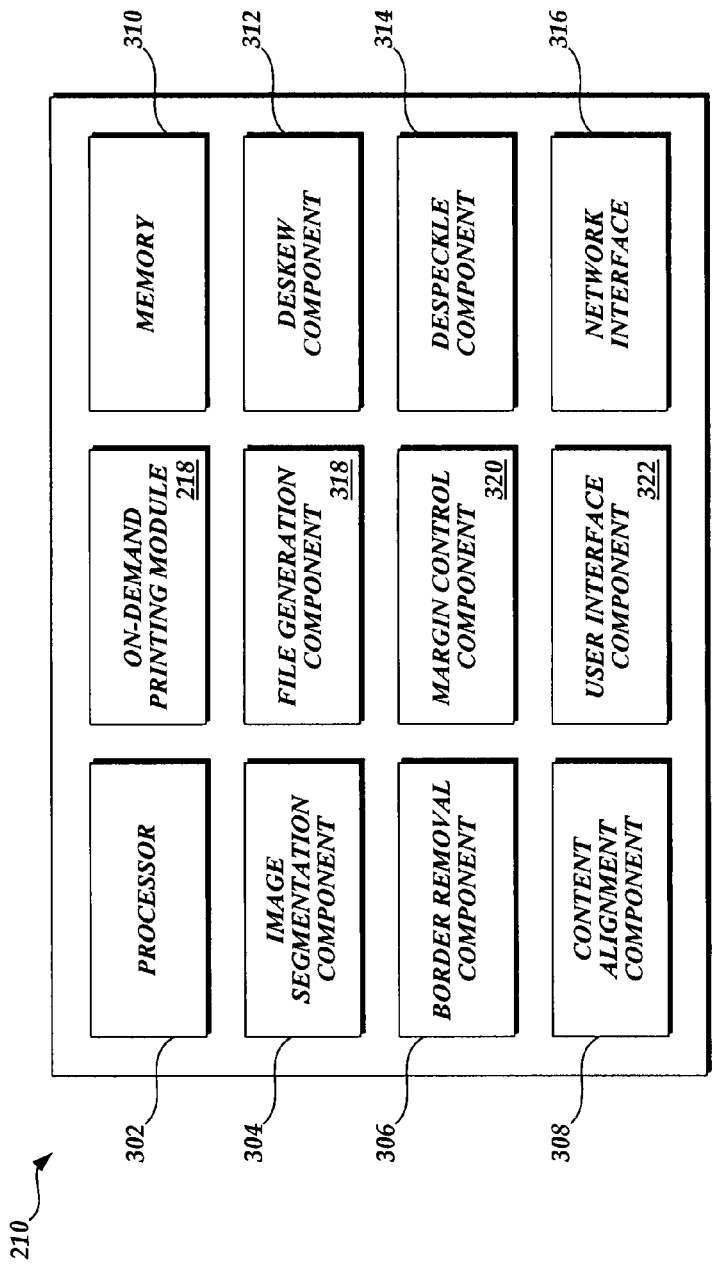
FIG. 3 is a pictorial diagram of an illustrative on-demand publishing site showing logical components for generating and processing a digital image of content for on-demand printing.

As shown in FIG. 3, the publication service 210 includes a processor 302 and a memory 310. As is well understood, the processor 302 executes instructions retrieved from memory 310 to carry out various functions, including processing a digital image for on-demand printing. The memory 310 comprises any number of combinations of volatile and non-volatile memory including, but not limited to, random-access memory (RAM), read-only memory (ROM), flash memory, disk storage, and the like. It should be further appreciated that there are a variety of computing devices that may be configured as a publication service 210, including but not limited to: personal computers, mini- and/or mainframe computers, laptop computers, and the like. Moreover, a publication service 210 may be implemented on a configuration of multiple cooperative computing devices interconnected via a network, including both local area networks (LANs) and wide area networks (WANs). Accordingly, while the following discussion will be made as though the publication service 210 is implemented on a single computing device, this is for ease of description only and should not be viewed as limiting upon the disclosed subject matter.

Also shown in the publication service 210 are various components that perform certain functions of processing a digital image for on-demand printing. However, it should be appreciated that these various components are logical components, not necessarily actual and/or discrete components, as any of the following-described components may be combined together or with other components, including components not discussed herein. Moreover, these various components of the publishing service 210 may be implemented in hardware, in software, or a combination thereof. The additional components may include, but are not limited to, an image segmentation component 304 for identifying content regions (image and text regions) which can be segmented from each page in a digital image, a border removal component 306 for removing border artifacts (such as border artifacts 110 or 112 of FIG. 1) from the pages of the digital image, and a content alignment component 308 for aligning content areas in the various pages.

Components further shown as included in the publishing service 210 may include a deskew component 312 for vertically aligning a content area in a digital image page, a despeckle component 314 for removing speckle artifacts (such as speckles 102-108 of FIG. 1) from a digital image page, a margin control component 320 for defining a fixed margin size for non-content area (i.e., blank space surrounding the content area) in a digital image page so that each digital image page can have the same margins, and a file generation component 318 for generating a print-ready document for on-demand printing. Still other components of a publishing service 210 include a user interface component 322 for interacting with a user in generating the on-demand print-ready document, a network interface 316 for, inter alia, receiving requests and content from outside sources, and an on-demand printing module 218 for initiating the printing of an on-demand print-ready document in response to a client request.

As mentioned previously in regard to FIG. 2, the publishing service 210 includes or is communicatively coupled to a content store 214 that stores scanned images of content as well as on-demand print-ready documents. Still further, the publishing service 210 typically includes or is communicatively coupled to an imaging device, such as a digital copier, a facsimile receiving device, or a scanner, such as scanner 220 of FIG. 2. These various imaging devices are useful for converting printed content into digital images and/or receiving digital images of printed content from clients.

Figure 4:
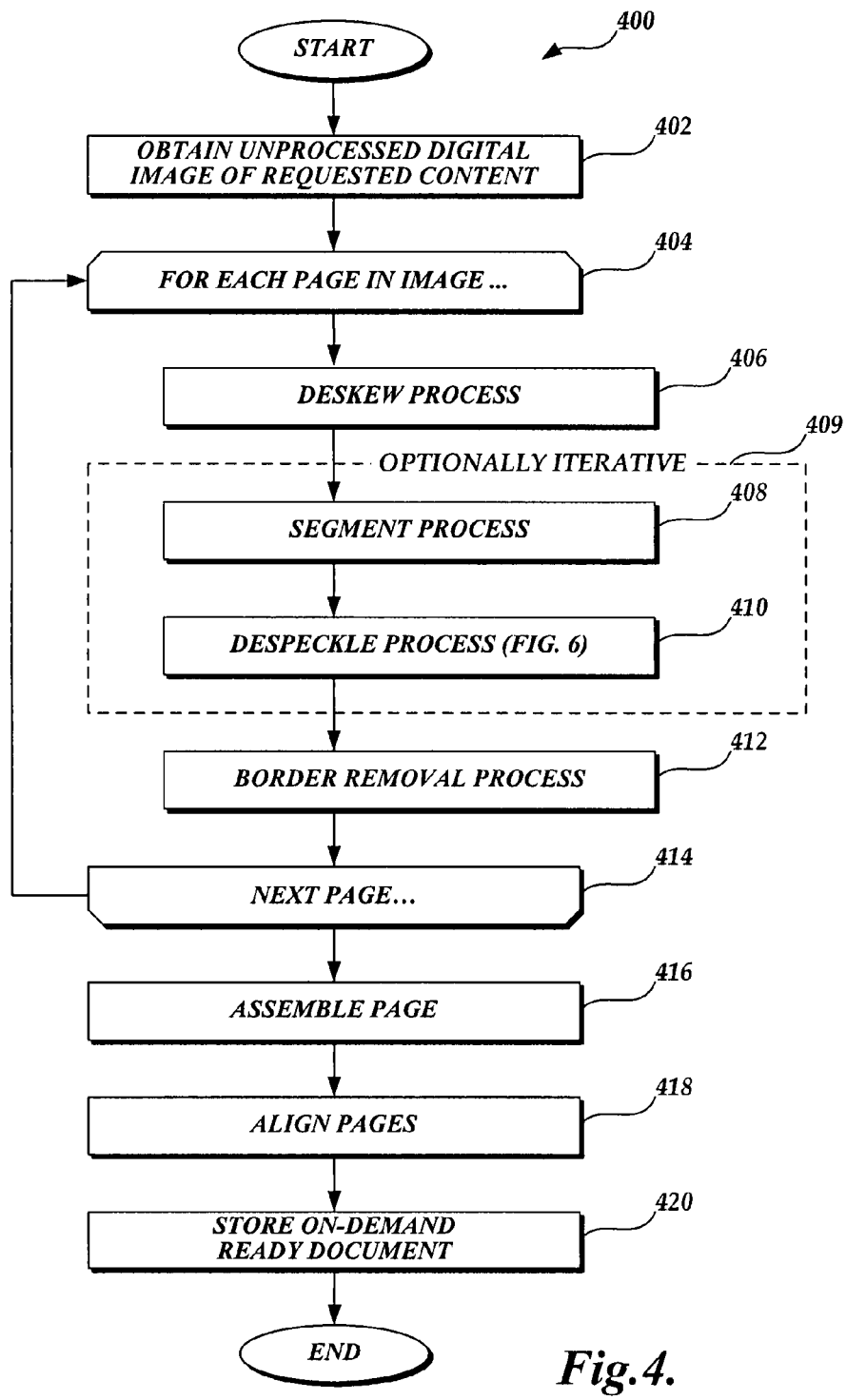
FIG. 4 is a flow diagram of an illustrative routine for generating and processing a digital image of content for on-demand printing.

With regard to processing a digital image for on-demand printing, FIG. 4 is a flow diagram of an illustrative on-demand printing service routine for processing a digital image of content for generating an on-demand printing ready document. Moreover, the discussion of FIG. 4 will be made with reference to FIGS. 5, 7, 8, and 12, each of which illustrates a pictorial diagram of a page of a digital image of content, and is suitable for describing the various processing steps of preparing the page for on-demand printing with regard to routine 400.

In one embodiment, the routine 400 is initiated as the publishing service 210 receives a user request for on-demand printing of a particular document or other content. For the purpose of discussion, it is assumed that the content store 214 coupled to the publishing service 210 includes a digital image file representing the requested content. Moreover, it is also assumed that the digital image file has not yet been processed to make it suitable for on-demand printing. By way of example, the requested content may include, but is not limited to, a book, a magazine, an article, a newspaper, etc. It is also further assumed that the requested content is available as digital image file and has not be previously processed and stored in the content store 214.

Beginning with block 402, the publishing service 210 obtains a digital image file from the content store 214 corresponding to the requested content. Alternatively, in the event where the digital image file corresponding to the requested content is not readily available from the content store 214, the digital image file may be obtained through scanning of a physical copy of the requested content. Irrespective of the manner or source from which the digital image file is generated and/or obtained, it should be appreciated that the digital image file will typically include a plurality of pages, each page corresponding to a printed page of content.

At control block 404, a looping construct, illustrated as a "for" loop, is begun that iterates through each page in the obtained digital image. Moreover, the control block 404 iterates through each page performing the steps between control block 404 and end control block 414. As those skilled in the art will appreciate, when all pages of the digital image have been processed, the routine 400 exits the looping construct and proceeds to block 416 as described below.

Figure 5:
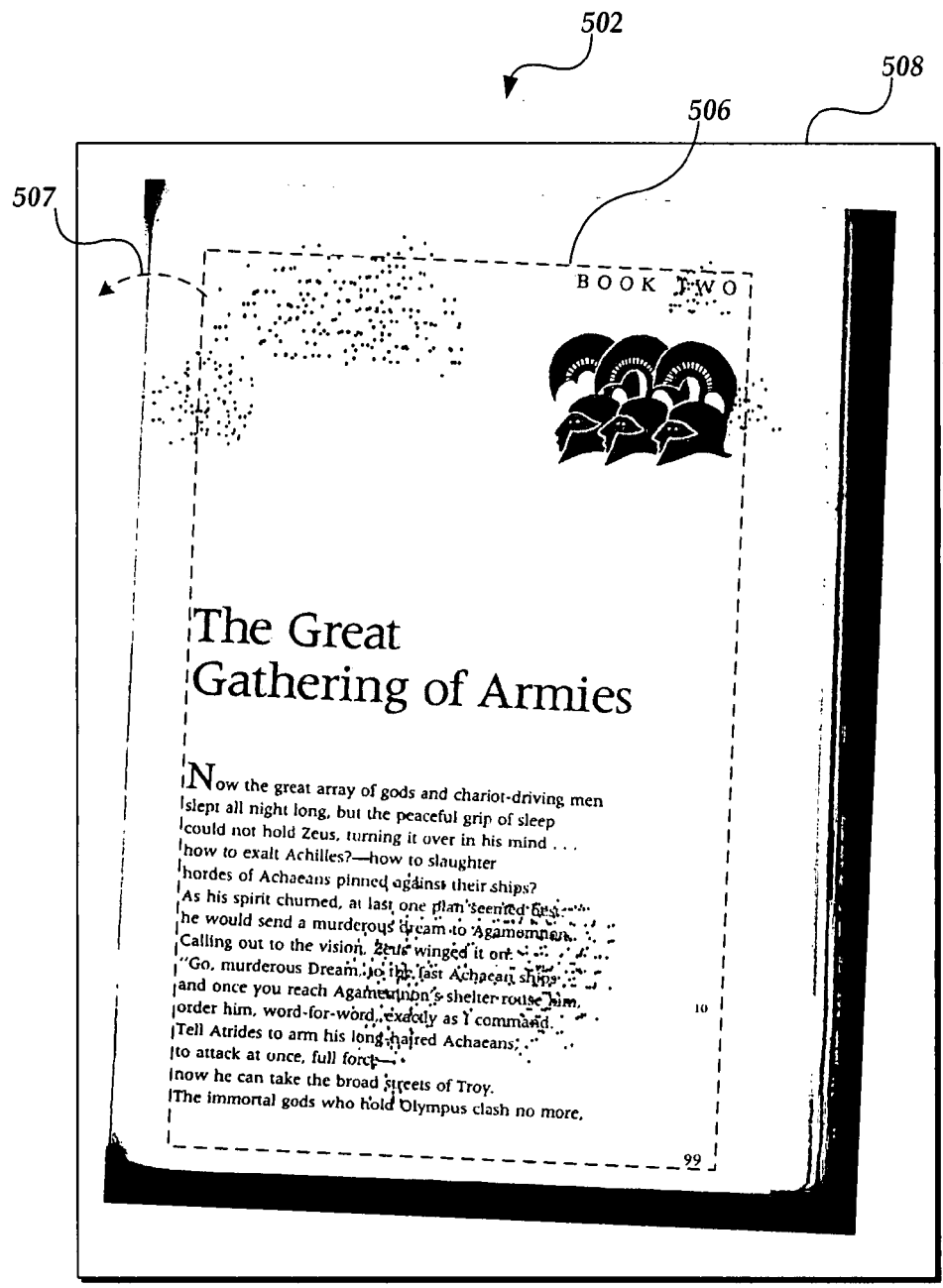
FIG. 5 is an illustrative digital image page with a content area that requires a deskew process.

At block 406, a "deskew" process may be performed on the current page of the digital image. The content of a page in a digital image is often tilted or skewed during the scanning or imaging process. The deskew process corrects the skewing in that it aligns or orients the page to a desired alignment (i.e., such that the page of content will be aligned/oriented with the printed page). For example, as shown in FIG. 5, page 502 is skewed/tilted with regard to the orientation of the printed page as indicated by box 508. Accordingly, at block 406, the exemplary routine 400 deskews the page 502 to align it with the desired orientation.

Figure 7:
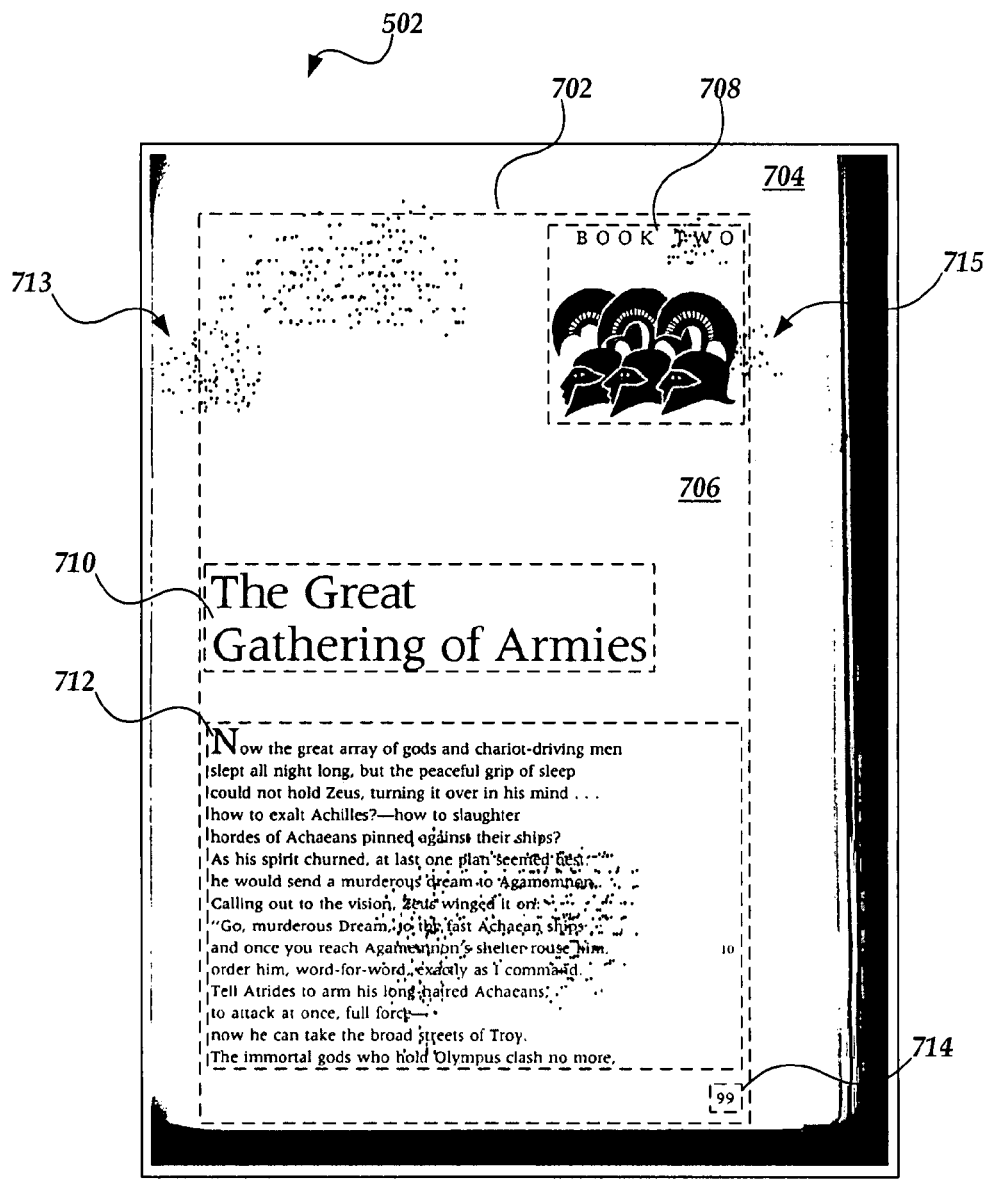
FIG. 7 is an illustrative digital image page that depicts several layers of segmentation produced from a segmentation process.

It should be appreciated that, for purposes of this disclosure, the term "orientation" is not a general reference to the arrangement of printed content on paper (commonly associated with terms such as "landscape" and "portrait") but rather is a reference to the rotation and position of the image content with regard to page image boundaries. Moreover, as will be appreciated by one of ordinary skill in the art, deskewing typically comprises rotating the content (i.e., page 502) such that its bounding box 506 is aligned with the desired orientation. In one embodiment, a bounding box, as used herein, is a rectangle that delineates the content of the page 502 from non-content areas (margins) of the page, as shown in box 506. The result of the deskewing process of block 406 is shown in FIG. 7 where the page 502 is "oriented" with the desired alignment 508.

At block 408, a segmentation process is performed on the current digital image page. The segmentation process identifies various areas or regions of the page and removes artifacts from those regions. The segmentation process may be repeated iteratively to identify various patterns, for example, text lines, graphics, background, margins, etc., in the content area in order to enhance artifact removal, including on or in between areas of the identified segments. In one embodiment, a segmentation process may be performed several times to achieve a different level of granularity in segmenting. In another embodiment, the type of content in a particular identified region determines the type of artifact removal that is performed. Additionally, in yet another embodiment, the segmentation process, in conjunction with the despeckle process, may be performed iteratively to enhance artifact identification and removal. Iterative segmentation and artifact removal are discussed later in greater detail in conjunction with FIGS. 7 and 8.

At block 410, a despeckling process is performed on the segmented digital image page. As suggested above, the despeckling process removes speckle artifacts (such as speckles 102-108 of FIG. 1) from the digital image page. The despeckling process can be iteratively performed along with a segmentation process, as illustrated at block 409. After the despeckling process selectively removes speckle artifacts from segmentations, the speckle artifacts residing on the digital page are greatly reduced. Moreover, with few artifacts, subsequent segmentation processing can produce improved segmentations. In turn, the improved segmentations will allow the despeckling process to more accurately identify and remove speckle artifacts. The despeckling process and iterative segmentation process will be discussed in a greater detail in regard to FIG. 6.

Figure 1:
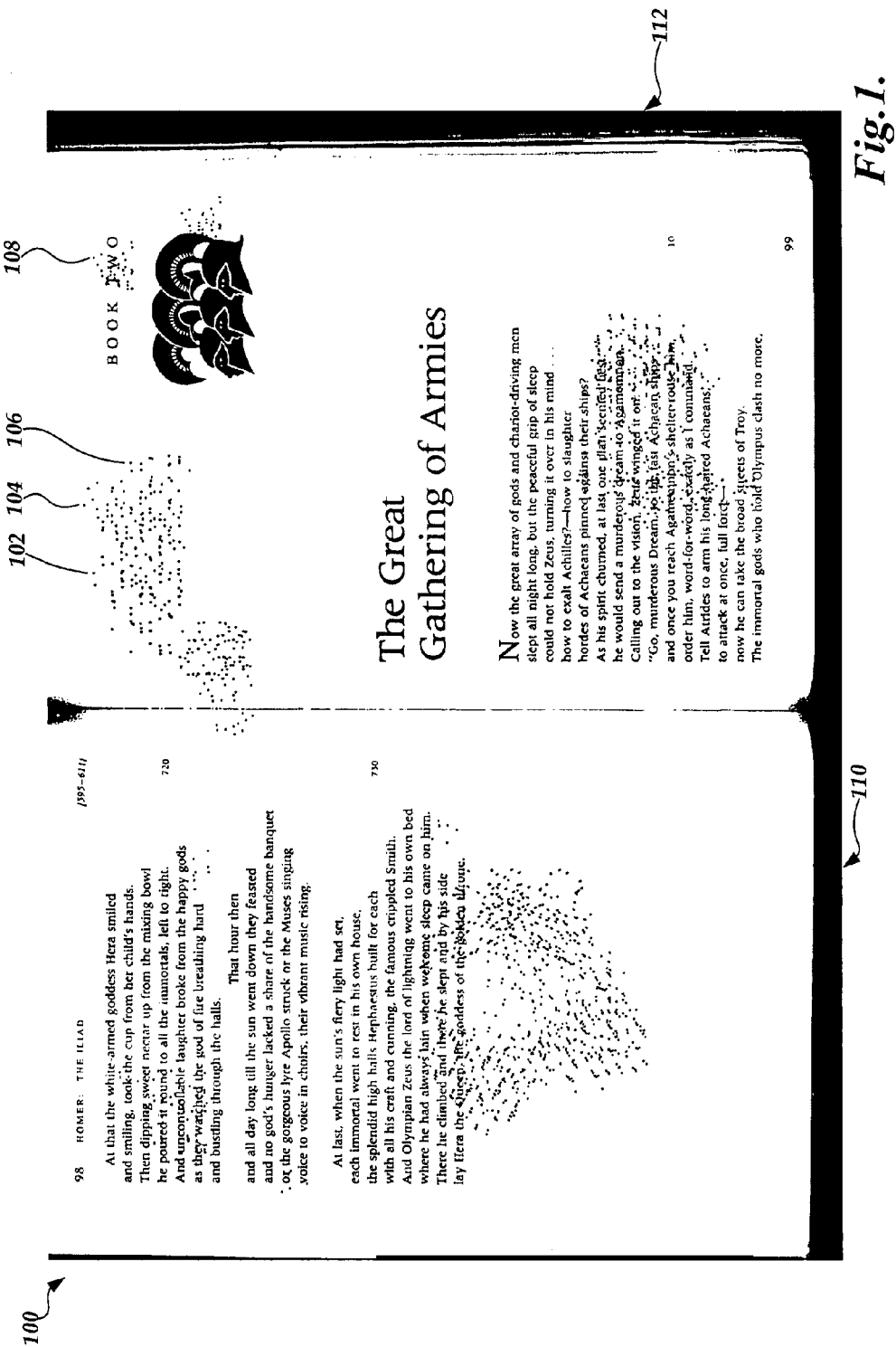
FIG. 1 is a digital image of a page from a book that illustrates the extraneous artifacts, including speckles and lines, which arise due to scanning, photocopying, or other imaging techniques.

At block 412, a border removal process may be performed for removing border artifacts (such as borders 110 and 112 of FIG. 1). The border removal process will be discussed below in greater detail in conjunction with FIGS. 10 and 11.

After each page of the digital image has been processed (deskewed, segmented, despeckled, and borders removed, corresponding to blocks 406-412), the publishing service 210 may perform various other processes to further process the page into a printing ready content. One process, at block 416, may be a "reassembly" or "reconstruct" process that assembles individual pages in accordance with a desired page order of the on-demand print ready document.

At block 418, an alignment process is performed across the reassembled pages. As will be well understood, in order to provide a pleasant look of the on-demand printed document, it is desirable that the content area on each digital image page be similarly aligned across all pages and placed at approximately the same position on each physical page of the on-demand printed document. However, while many digital images are generated by scanners, some digital images may be generated through different imaging devices, resulting in misalignment among digital image pages. Further, even before scanning of a book, the physical pages of the book can be misaligned due to various errors in the printing or binding process. In order to place the content area of each digital image page at approximately the same position on a physical page of the on-demand printed document, an anchor point of a bounding box, such as bounding box 506, may be used to align the content area across the digital image pages. The anchor point may be defined for the alignment process, for example, the top left corner of the bounding box or the center of the bounding box.

In some instances, some outermost bounding boxes of the digital image pages have differences in size. For example, a first digital image page for a chapter which contains less text lines may have a smaller outermost bounding box than the rest of the digital image pages. In such a case, the publishing service 210 may define margins to the outermost bounding boxes and control the margins on a digital image page based on the size of the outermost bounding box.

In one embodiment, the publishing service 210 may allow an end user to specify desirable margins for a physical page of the on-demand printed document. In one embodiment, for each image page, typical margins and minimal margins are identified. The typical margins may be determined from the outermost bounding box and the minimal margins may be determined from a theoretical box encompassing the content area and all other images on the page such as annotations, notes, headers and footers, and the like. The publishing service 210 may determine a final trim box that satisfies both typical margin and minimal margin requirements. Subsequently, all images on a digital image page are cropped by the final trim box. As a result, the output images will have consistent margins across the pages.

After the digital image pages are aligned and have defined margins, a print-ready document file is ready for on-demand printing of the content, and at block 420, the print-ready document is stored in the content store 214. Thereafter, the routine 400 terminates.

It is noted that the aforementioned processes and embodiments are described only for illustrative purposes and, thus, it is contemplated that all or some of processes described in FIG. 4 can be fully automated or partially automated. It is further contemplated that some of processes described in FIG. 4 can be implemented in parallel on several discrete systems by one or more cooperative executable modules to efficiently produce a print-ready document. Still further, while the focus of the above routine 400 was to produce an on-demand print-ready document, it should be appreciated that the routine 400 may be used to simply improve the quality of a digital image, irrespective of whether or not the image is to be printed. More particularly, the output of an image processed according to routine 400 may be a document ready for an electronic book reader, or to clarify a faxed document. Accordingly, while the disclosed subject matter is well adapted for generating an on-demand print-ready document, this should be viewed as an illustrative application of the disclosed subject matter, and not as being limited thereto.

Figure 6:
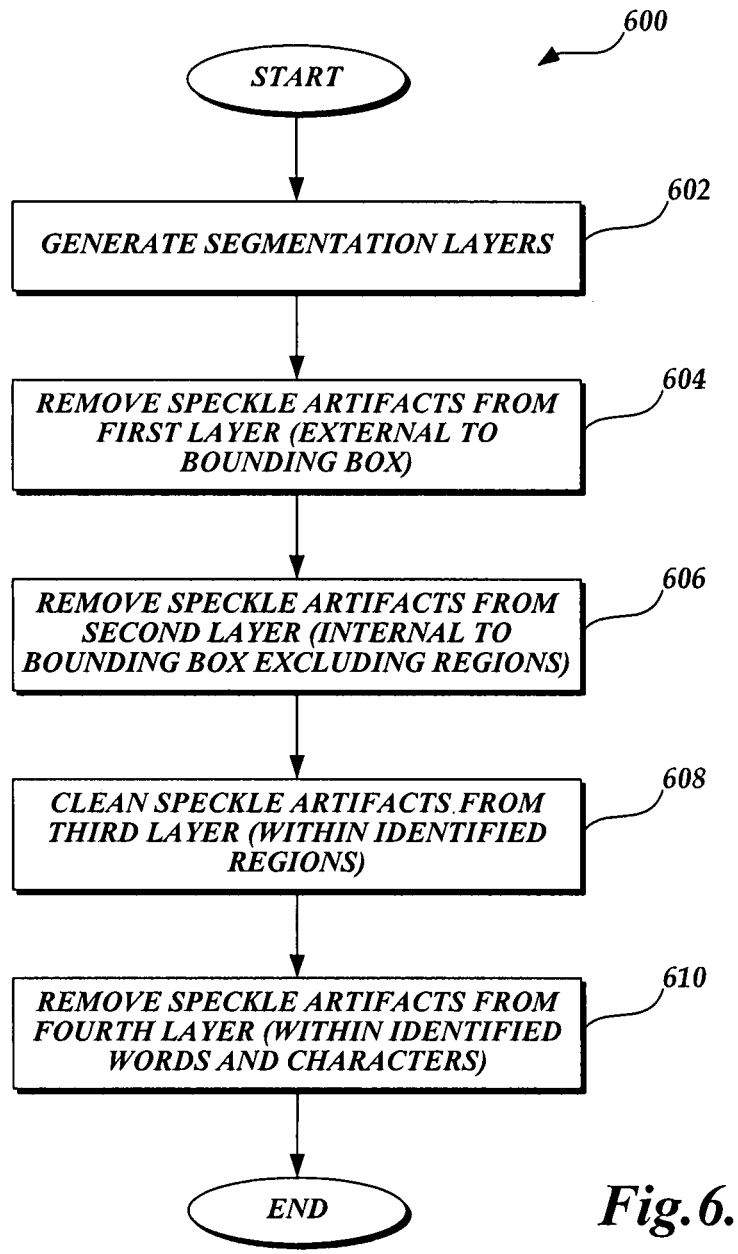
FIG. 6 is a flow diagram of an illustrative routine for a layered despeckling process that removes speckling artifacts on each segment layer with a different degree of artifact removal.

FIG. 6 is a flow diagram of a layered despeckling routine 600 for removing speckle artifacts from a digital image page in accordance with various embodiments of the disclosed subject matter. As those skilled in the art will appreciate, conventional despeckling processes typically use a generic median filter across the entire page image, which usually degrades the quality of the digital image page. In some cases, using such a median filter results in making the textual content unrecognizable as the median filter is unable to differentiate speckle artifacts from the textual content and, by applying aggressive speckle/noise removal processes on the textual content, some portion of the textual content may be erroneously deleted.

In at least some embodiments described herein, the publishing service 210 may identify several layers or areas of a digital image page and apply a layered despeckling process that uses a different speckle artifact removal criteria for each particular layer. The removal criteria may be determined to maintain a balance between the quality of the content and the accuracy in removing speckle artifacts.

There are various ways to identify and generate layers of the digital image page. However, for the purpose of discussion, it is to be assumed that the layers of the digital image page are identified through an iterative segmentation process, such as that described in FIG. 4. That is, the publishing service 210 defines threshold criteria for despeckling the page image such that despeckling may be repeatedly/iteratively performed until the resulting image page meets the threshold criteria for the speckle noise removal. As mentioned above, this iterative, continuous process is set forth in regard to FIG. 6.

Beginning at block 602, a first segmentation process is performed to produce several segmentation layers. Results of a segmentation process may include text regions, image regions, text lines, words, characters, and the like. In one embodiment, the segmentation process results in segments corresponding to the images, text regions, and, within text regions, text lines.

Each segment/layer is associated with a type of content within the segment. Correspondingly, based on the type of content, a suitable despeckling process or criteria is selected and applied. Thus, if a layer includes less important content or no content, such as the margins of a page, the publishing service may apply an aggressive despeckling process. Likewise, if a layer includes more important content, such as textual content, the publishing service may apply a conservative despeckling process.

To begin generating the layers/segments, as shown in FIG. 7, an outermost bounding box 702 of a digital image page 502 is first identified. The first layer may be a non-content area 704 that is the outside the outermost bounding box 702 on the digital image page 502. A second segment or layer 706, corresponding to the inside of the outermost bounding box, i.e., the content area that is the union of all the content regions, text line regions, and image regions, is identified/generated. The second layer may be an area 706 including image region 708 and text regions 710-714, which is internal to the bounding box 702. A third layer (not shown) may be the inter-regional area of a text line region that contains only text and is grouped by individual lines of text. As suggested above, depending on a need of the publishing service, additional layers may be defined and identified for the layered despeckling process. For example, a fourth layer may correspond to words-and-character regions within individual text line regions.

With regard to FIG. 6, at block 604, the publishing service 210 removes speckle artifacts in the first layer which is an external area (such as non-content area 704 in FIG. 7) to the outermost bounding box 702. With reference to FIG. 7, removing artifacts in the first layer would likely affect those artifacts pointed to by arrows 713 and 715. On the first layer, as this is a non-content area, the publishing service 210 could apply an aggressive noise/artifact removal process, such as a median filter, to delete most speckle noises.

At block 606, on the second layer (such as a content area 706 in FIG. 7), the publishing service 210 may apply a more conservative noise removal process to delete speckle noises. As applied, the despeckle process may remove most speckles that are found in the area internal to the bounding box 702 and inter-regional areas (such as areas outside of image region 708 and text line regions 710-714) but excluding the content internal to those regions/areas (i.e., the image and text areas).

Figure 8:
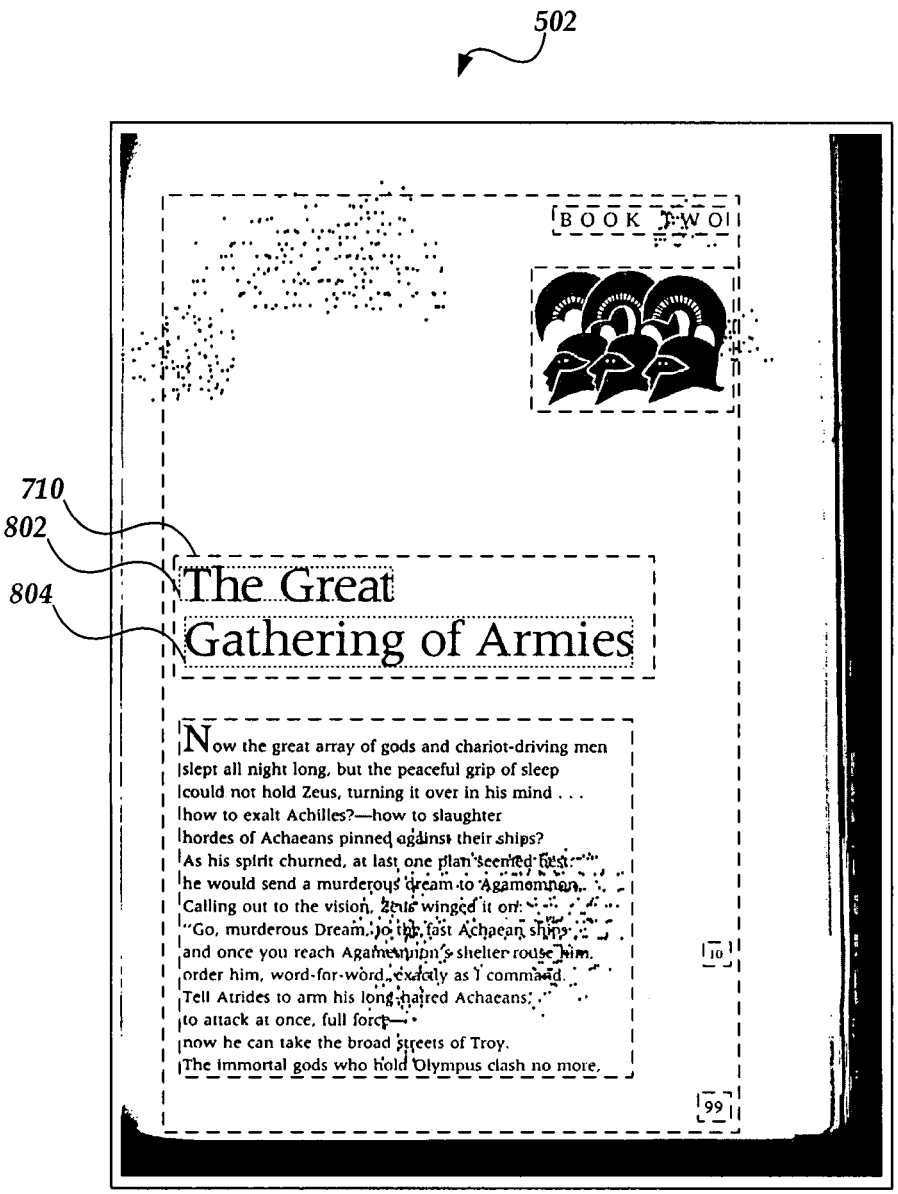
FIG. 8 is an illustrative digital image page that depicts another layer of segmentation produced from a segmentation process.

At block 608, another despeckling process may be applied to a third layer of segments to despeckle inter-regional areas. As shown in FIG. 8, a third layer may be defined within text regions, such as region 710, that identifies text lines, as indicated by text lines 802-804. In applying the despeckling process to this third layer, the inter-regional area of a text region 710 that falls outside of text lines 802-804 is processed. On this third application of despeckling, the publishing service 210 may optionally apply a more conservative noise removal process to remove speckle artifacts (noises) such that the textual content remains intact. Of course, in an alternative embodiment, the despeckling process may not be applied to the third layer in order to prevent any quality degradation in the textual content. In yet further embodiments, the layered despeckling process may be applied to the fourth layer, such as an inter-words and/or inter-character layer of the text lines 802 and 804.

As mentioned above, for each type of segment being processed, a corresponding despeckling algorithm is applied. In other words, the despeckling process is a content-aware despeckling process. For inter-regional (e.g., areas between image segments and text segments) a more aggressive despeckling algorithm or removal threshold may be applied. As one example, in the most aggressive despeckling, connected pixels (as determined by a connected component algorithm) of less than 50 pixels are removed as superfluous noise. Alternatively, when despeckling within a text region, connected pixels of less than 10 pixels are removed as being superfluous noise. Still further, when despeckling between segments of text lines, a yet more conservative threshold is used, such as removing only connected pixels of 5 or less.

As discussed above, the layered despeckling process, in conjunction with an iterative segmentation process, may improve the image quality of the on-demand printing ready document because after each despeckling process, less speckle artifacts (noises) may remain on the digital image page. In other words, (while not shown) after segmenting and despeckling the digital image page, the process may be repeated. The despeckling enables a subsequent segmentation process to achieve more improved segmentations. The publishing service 210 may continue this iteration of segmentation/despeckling until predetermined threshold criteria for the despeckling process have been met. Additionally, the iterative segmentation and despeckling process can be used to generate various outputs, including XML files, TIFF files, etc.

Referring now to FIGS. 9A and 9B, block diagrams 900 and 910 illustrate two possible iterative processes using iterative segmentation and layered despeckling. As shown in FIG. 9A, as a part of the layered despeckling process, the publishing service 210 may utilize despeckling criteria/thresholds to determine whether another iteration of despeckling should occur, as indicated by decision block 902. By way of example, the despeckling criteria may be based on a ratio of the speckle artifacts removed versus the speckle artifacts remaining, or an absolute number of speckles removed. At decision block 902, if the threshold criteria have not been met, a segmentation process will be applied to get a better defined segmentation result for the digital image page, which will in turn lead to a better result in recognizing content from speckles in the subsequent despeckling process.

Figure 10:
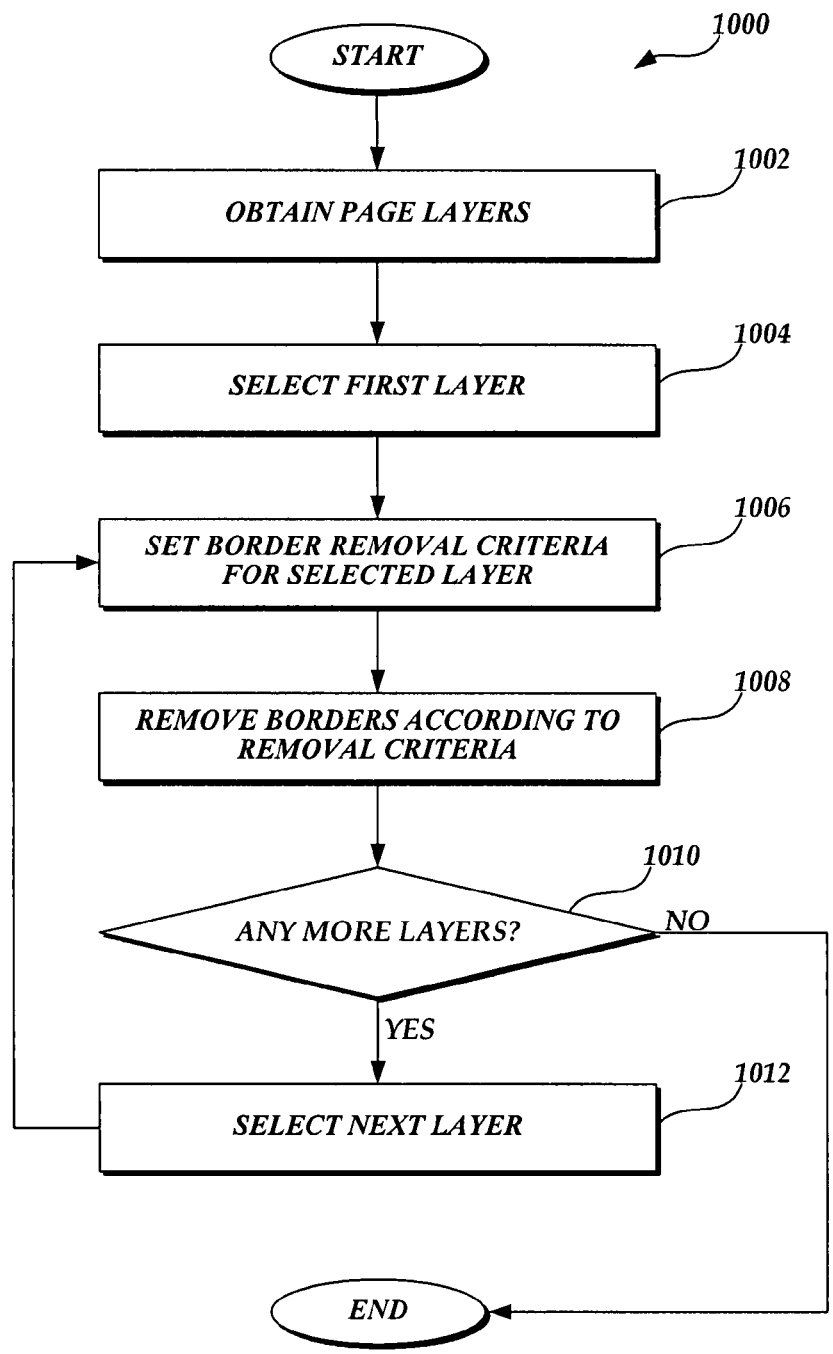
FIG. 10 is a flow diagram of an illustrative border removal routine for removing border artifacts from a digital image page.
Figure 11A:
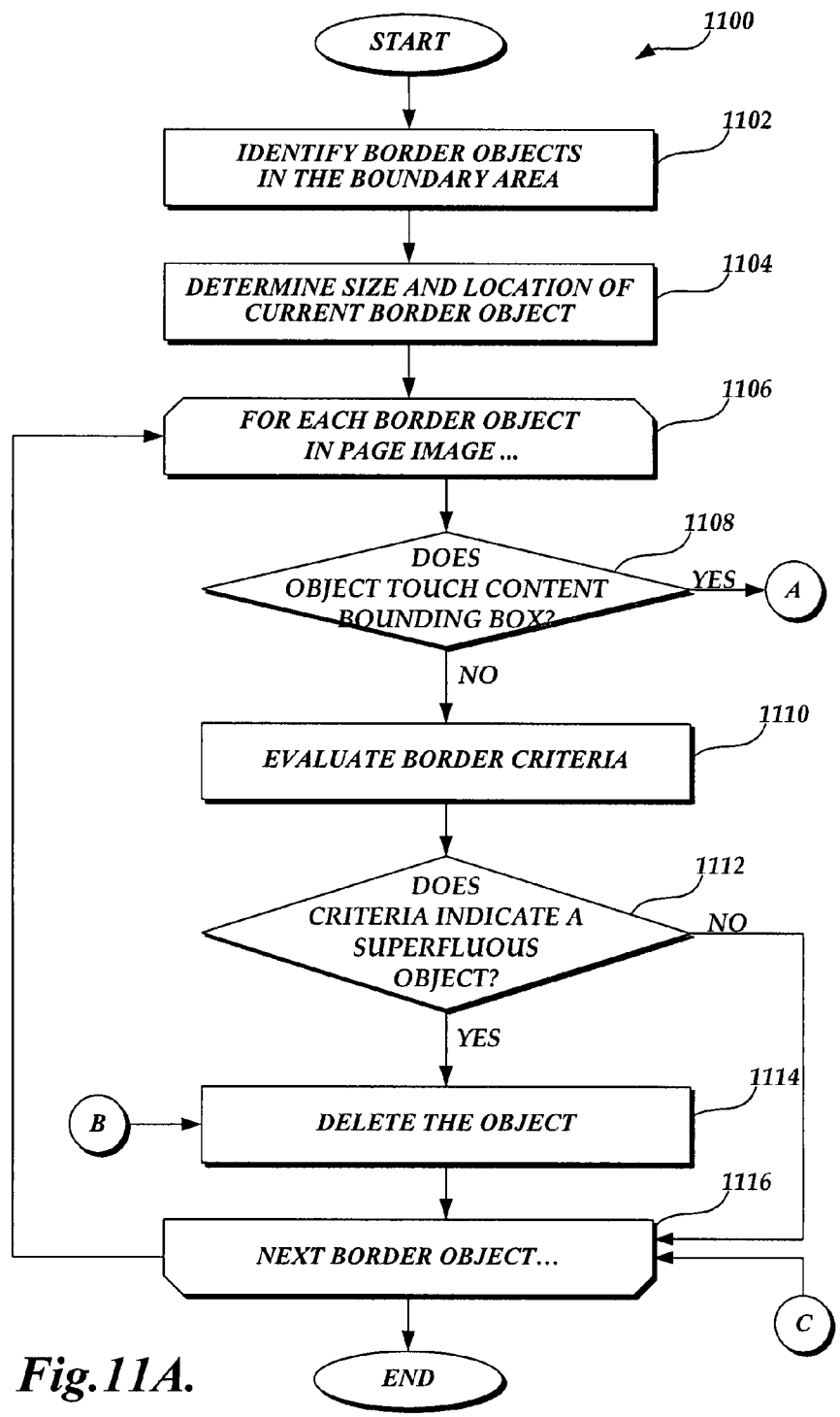
FIGS. 11A and 11B show a flow diagram of an illustrative connect component analysis routine for identifying a border object from a digital image page.

As will be appreciated by one of ordinary skill in the art, the despeckling criteria may be modified and tuned based on the importance of the content on the layer, the possibility to degrade the quality of the content by removing speckles, the richness of the content, etc. As an alternative to focusing on despeckling, and as shown in FIG. 9B, when the segmentation process and despeckling process are used as a part of an Optical Character Recognition (OCR) process, an alternative set of criteria can be used. For example, rather than focusing on despeckling criteria, the criteria may be made in terms of segmentation criteria, as indicated by decision block 912, with the result being a better segmented image. Of course, when better segmentation is achieved, more specific and higher performing despeckling can be applied to that segment without the loss of content. By way of example, but not limitation, the segmentation criteria may be based on the number of words recognized by an OCR engine from a corresponding layer FIG. 10 is a flow diagram of a border noise removal routine 1000 for removing border artifacts from a digital image page, such as page 502 of FIG. 5, in accordance with embodiments of the invention. As described above, the border noise removal process can be implemented after any combination of a segmentation process and/or a despeckling process has been applied to the digital image page. Thus, the border noise removal routine 1000 may be implemented in conjunction with the iterative segmentation process illustrated in FIG. 6.

For the purpose of discussion, it is assumed that a segmentation process may be used to identify several different layers, for example, a first layer (background, non-content area), a second layer (content area which is the union of all the content, text, and images), a third layer (text lines), etc. It is further assumed that a degree of border noise removal will be tailored for each layer based on the importance of the content or the richness of the content within the layer.

Beginning with block 1002, the page layers or segments are obtained, such as a first layer (boundary region or background), a second layer (a content box region) and a third layer (regions which the publishing service wants to preserve without any change, e.g., text lines regions). At block 1004, the first layer of segments is obtained.

At block 1006, border removal criteria for the current level is selected. If this is the first level, border removal criteria is selected for removing almost all border artifacts, noises, etc., from the first layer. As described above, the first layer is generally a background/non-content area, hence the aggressive removal process.

At block 1008, the border artifacts found in the current layer based according to the selected border removal criteria are removed. In one embodiment, the publishing service may apply a connected component analysis to the first layer, which identifies border objects and analyzes pixels in the border objects to identify a border artifact that is to be removed. The connected component analysis and associated border removal criteria will be explained later in FIG. 11.

At decision block 1010, a decision is made as to whether there are any additional content layers to be processed. If so, at block 1012 the next layer is selected, the routine proceeds to block 1006 where border removal criteria for the now-current layer is selected, and the above-described process is repeated. This continues until, at decision block 1010, there are no more layers to process and the routine 1000 terminates.

With each layer, suitable border removal criteria is selected. This selection assists in maintaining a balance between accurately identifying and removing border artifacts and preserving the important content.

FIG. 11 is a flow diagram of a border removal routine 1100 for removing superfluous border artifacts from a digital image page in accordance with various embodiments of the disclosed subject matter.

Figure 12:
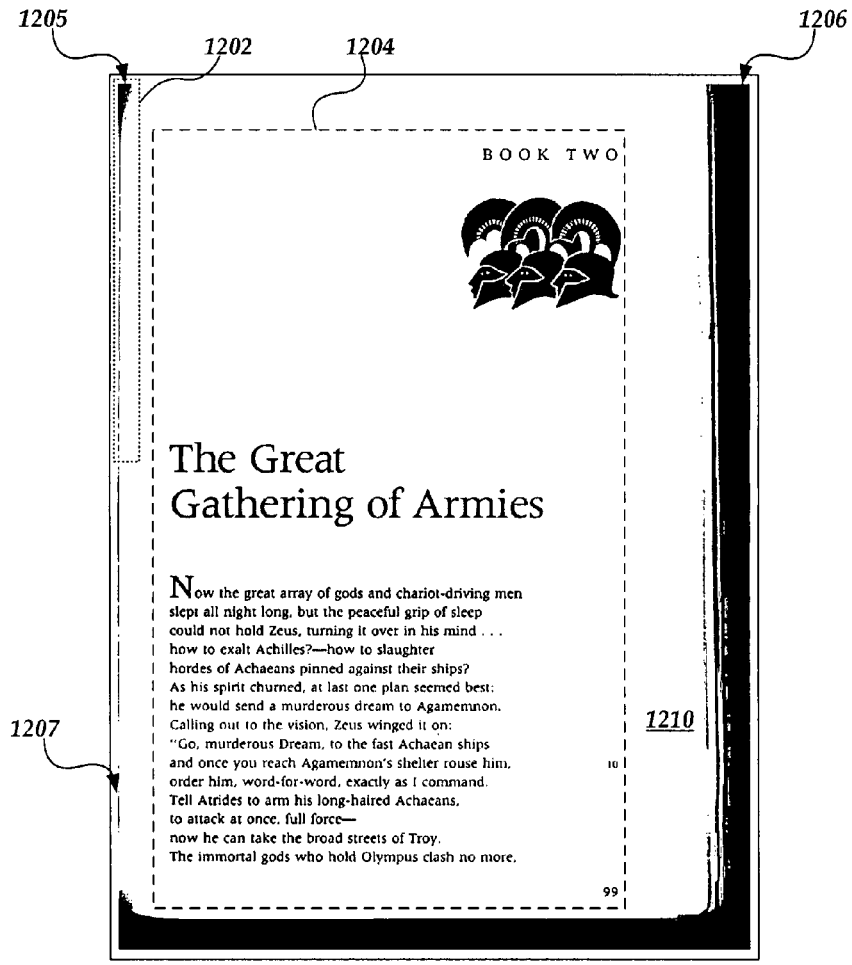
FIG. 12 is an illustrative digital image page that shows several border objects identified and processed through the illustrative connect component analysis routine of FIG. 11.

Beginning at block 1102, border objects for the digital page image are identified. In particular, border objects are superfluous (i.e., not part of the page content) objects/artifacts that fall outside of the content area of a page image but within the page boundaries. Illustrative border objects are shown in FIG. 12, including border objects 1205, 1206, and 1207. Identifying border objects may be accomplished in a variety of manners, all of which fall within the scope of the disclosed subject matter. However, in an illustrative embodiment, border objects may be found using a connected component algorithm (which is known in the art) that, generally speaking, for a given pixel/artifact, identifies other pixels that are adjacent to or connected to the given pixel. At block 1104, the size and location of the border artifacts is determined.

At control block 1106, a looping construct is begun to iterate through all of the identified border objects. For each border object, at least some of the steps up to end control block 1116 are executed. In particular, at decision block 1108, a determination is made as to whether the border object, such as border object 1205, touches or crosses within the page content's bounding box 1204. If it is determined at decision block 1108 that the border object does not touch the content bounding box 1204, at block 1110 the border object is evaluated according to various criteria to determine whether the border object should be removed. These criteria include by way of illustration, but are not limited to, whether the border object is closer to the content box 1204 or to the page boundary (with those closer to the page boundary more likely superfluous); whether the border object is aligned with, or oblique to, the nearest page boundary (indicating a possible intended page border); a ratio of the width to the height of the border object such that if greater than a threshold the border object is considered superfluous; and the like.

At decision block 1112, if the evaluation of criteria indicates that the border object is superfluous, the routine 1100 proceeds to block 1114 where the border object is removed from the digital image page. Alternatively, if the evaluation of criteria indicates that the border object should be retained, or after deleting the border object, the routine 1100 proceeds to end control block 1116 where the routine 1100 returns to control block 1106 if there are additional border objects to process. Otherwise, the routine 1100 terminates.

Figure 11B:
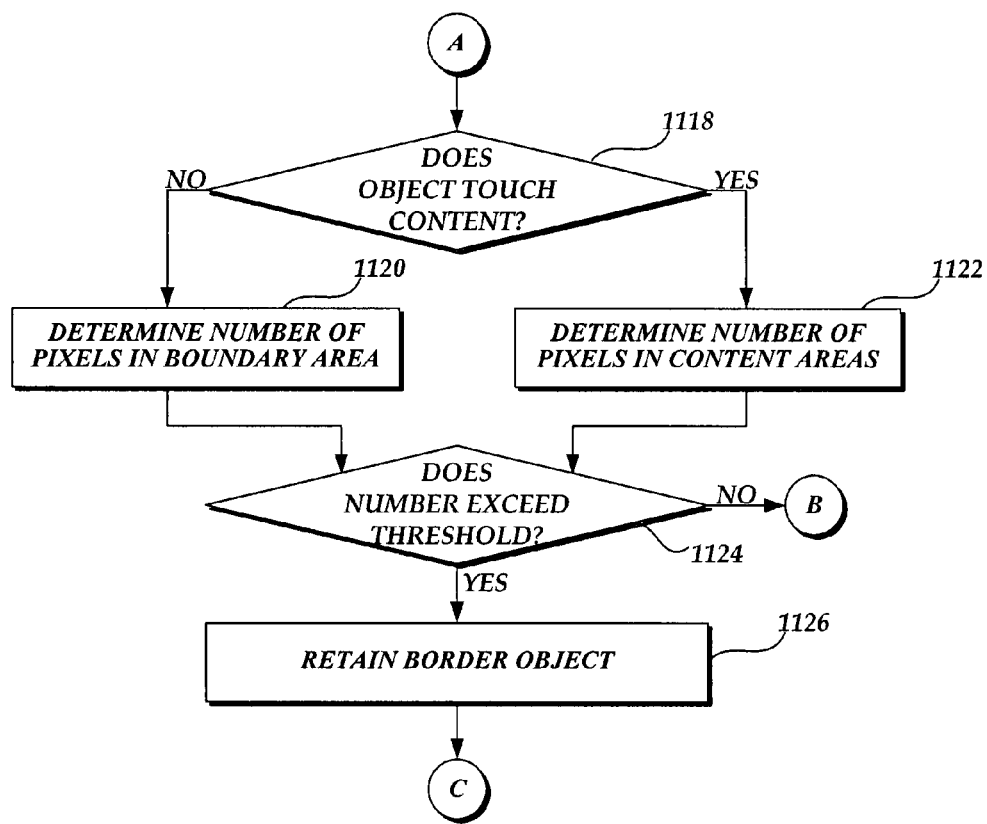

Returning to decision block 1108, if the border object touches (or crosses within) the content's bounding box 1204, the routine 1100 proceeds to decision block 1118 (FIG. 11B). At decision block 1118, the border removal component may determine whether the border object's bounding box 1202 touches content regions in the content bounding box 1204. If the border object (via the border object's bounding box 1202) does not touch any content in the content bounding box 1204, it may be safe to remove the border object as described below since removal of such object does not cause a removal of any part of the content regions in the digital image page.

At block 1122, the number of pixels of the border object within the content region is determined. If, at decision block 1124, the determined number of pixels exceeds a predetermined threshold, this may indicate that removing the border object may cause a degradation in the quality of the image/content. In such a case, at block 1126, the border object may not be deleted from the digital image page, to preserve the content region, and the routine 1100 proceeds to block 1106 as described above. Alternatively, if the number of pixels of the border object within the content region does not exceed the predetermined threshold, at block 1114 (FIG. 11A), the border object 1205 is deleted from the digital image page.

If it is determined at decision block 1118 that the border object 1205 does not touch any content regions, at block 1120, the number of pixels of the border object residing in the boundary area 1210 will be evaluated to determine whether the border object is a border artifact that is to be removed. If, at decision block 1124, the number of pixels of the border object residing within the boundary area does not exceed a predetermined threshold, at block 1120 the border object is deleted from the digital image page. Alternatively, if the number of pixels exceeds a threshold, this may indicate that the border object should not be deleted from the digital image page and at block 1126 the border object is retained.

After all border objects in the page have been processed, as determined at end control block 1116, the routine terminates.

It is to be noted that the above-mentioned rules explained in FIG. 11 are used for illustrative purpose only and thus should not be considered as limiting. It is to be further noted that depending on the type of a border object, various border object removing rules and criteria will be used to determine whether the identified border object is to be removed or not. As shown in FIG. 13A, an identified border object 1302 may have a shape that surrounds the outermost bounding box (content bounding box), which has a border object bounding box bigger than the outermost bounding box. However, as shown in FIG. 13A, the border object 1302 does not touch or intersect the outermost bounding box. In order to process such a border object, as shown in FIG. 13B, the publication service may divide the boundary area into 4 rectangular areas, such as cutting areas 1304, 1306, 1308, and 1310, and evaluate the number of pixels in each rectangular area. Thus, for each rectangular area, the border removal routine can be applied and each fraction of the border object can be treated as an individual border object.

Figure 14A:
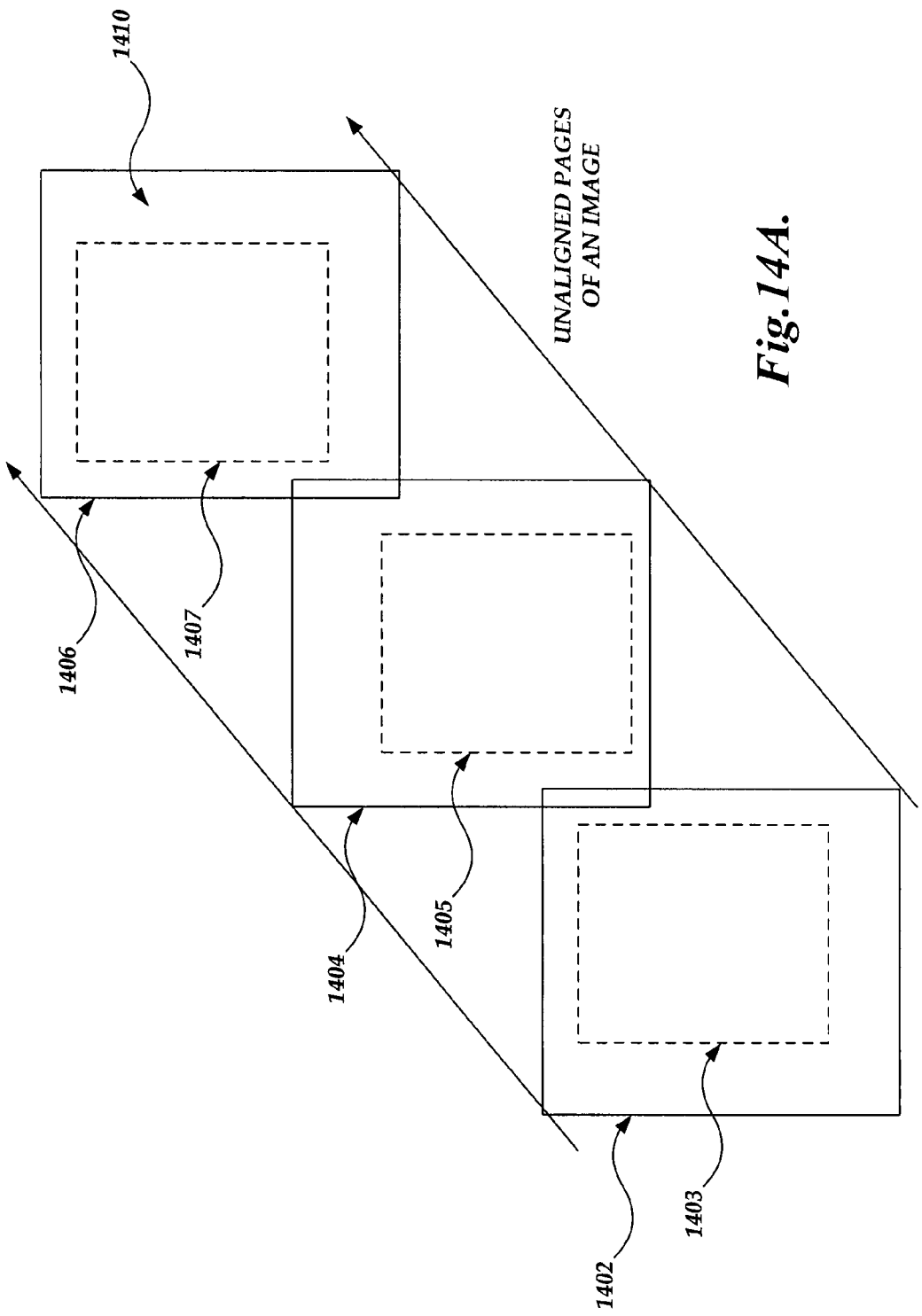

As mentioned above, one aspect of preparing a digital image for on-demand printing is to arrange all pages within the image so that the content of each page is similarly located. The need to arrange and align pages of a digital image arises due to a variety of factors, including issues with regard to scanning a printed copy of the content. By way of illustration example, FIG. 14A is a block diagram illustrating multiple pages of a digital image where the content (as represented by the bounding boxes) of the images are misaligned with respect to each other. Alternatively, when printed, as shown in FIG. 14B, it would be desirable to have the content of the page images similarly aligned.

Figure 15:
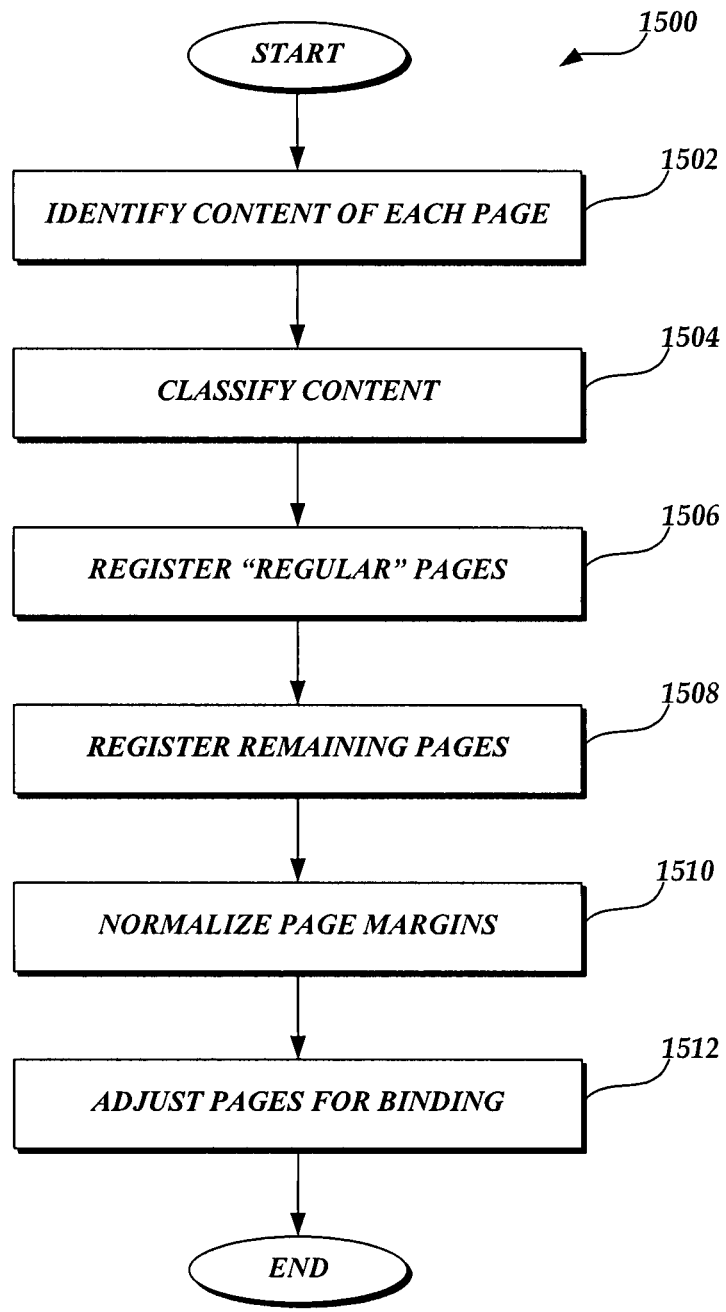
FIG. 15 is a flow diagram of an illustrative routine for aligning pages of a digital image.

FIG. 15 is a flow diagram of an illustrative routine 1500 for aligning pages of a digital image. Beginning at block 1502, content bounding boxes for each page of the image are identified. Examples of content bounding boxes are shown in FIG. 14A, boxes 1403, 1405, and 1407 of pages 1402, 1404, and 1406, respectively. At block 1504, the pages are then classified as being one of empty, regular, or irregular according to the context boxes, and particularly according to the context box size.

At block 1506, the "regular" pages of the image are registered, meaning that a registration point common to all regular content boxes is placed at a common location for the page. While any number of points may be used as a registration point, in one embodiment, the top left corner of the content box is used as the registration point and the content of the "regular" pages of the image are positioned on their respective pages with their registration point at a common location on the page. At block 1508, the remaining pages with content (i.e., the "irregular" pages) are registered with the "regular" pages such that content thereon is positioned as best as possible, if not optimally, with the content of the other pages At block 1510, the margins for the pages are normalized, i.e., made the same. Normalizing page margins addresses the fact that the content of the pages may be of different sizes (whether or not the pages are regular or irregular pages). After normalizing the page margins for the pages in the image, adjustments may optionally be made for binding purposes. For example, binding width may be added to the left margin of odd numbered pages while, conversely, binding width may be added to the right margin of even numbered pages. Thereafter, the routine 1500 terminates.

While the above description is generally made in regard to receiving a client request for on-demand printing of content, it should be appreciated that this is an illustrative example, and the subject matter disclosed above should not be construed as limited to this particular scenario. In alternative embodiments, rather than waiting for a consumer's request for on-demand printing, a service may anticipatorily process content for on-demand printing and store the processed content in the content store 214. Still further, the processed content may be used in ways other than for on-demand printing. For example, the processed content may be used in electronic book readers, on user computers, and the like. Moreover, the processed content may be stored in any number of formats, both open and proprietary, such as XML, PDF, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for removing a plurality of artifacts from a page of a digital image, the method comprising:
  obtaining the digital image having the page;
  determining a content bounding box for content of the page;
  generating a set of segments corresponding to areas of the content within the content bounding box according to a segment type in a plurality of segment types, each segment type corresponding to a type of content in a respective one of the segments;
  for each segment of the set of segments:

determining a level of importance associated with the corresponding segment type, wherein the plurality of segment types comprises an image type and a text type;

selecting despeckling criteria based at least in part on the level of importance for identifying superfluous artifacts, wherein a first despeckling criteria is selected on a low level of importance and a second despeckling criteria is selected based at least in part on a high level of importance, wherein the second despeckling criteria is more conservative with respect to an artifact removal than the first despeckling criteria;

identifying artifacts according to the despeckling criteria; and removing the artifacts from the page; and storing an updated digital image in a content store.

2. The method of claim 1, wherein the plurality of segment types further comprises a background type.

3. The method of claim 1, wherein the despeckling criteria for a background segment more aggressively identifies the artifacts than for a text region segment.

4. The method of claim 1, wherein selecting the despeckling criteria for identifying the artifacts comprises selecting a threshold count under which connected pixels are removed.

5. A method for removing a plurality of artifacts from a page of a digital image, the method comprising:

obtaining the digital image having a plurality of pages;

for each page of the digital image:
  determining a content bounding box for content on the page;
  segmenting the content within the content bounding box to generate a set of segments, each of the segments having a corresponding one of a plurality of segment types according to a type of content in a respective one of the segments, at least some of the segment types having a hierarchical relationship;
  for each segment of the set of segments:
    determining a level of importance associated with the corresponding segment type;
    selecting despeckling criteria for identifying the artifacts within the segment based at least in part on the level of importance associated with the corresponding segment type, wherein a first despeckling criteria is selected if a low level of importance is associated with the segment and a second despeckling criteria is selected if a high level of importance is associated with the segment, wherein the second despeckling criteria is more conservative with respect to an artifact removal than the first despeckling criteria;
    identifying the artifacts within the segment according to the selected despeckling criteria; and
    removing the identified artifacts from the segment of the page; and
  storing an updated digital image in a content store.

6. The method of claim 5, wherein the plurality of segment types comprises at least one of a background, an image, a text region, or a text-line region.

7. The method of claim 5, wherein selecting the despeckling criteria for identifying the artifacts with the segment comprises selecting a threshold count under which connected pixels are removed.

8. The method of claim 7, wherein the connected pixels are identified according to a connected component algorithm.

9. A non-transitory computer-readable medium bearing computer-executable instructions which, when executed on a computing device having a processor and a memory, and connected to a content store, carry out a method for processing a digital image of content to remove a plurality of artifacts from the content of the digital image, the method comprising:

obtaining the digital image, wherein the digital image comprises a plurality of pages;

for each page of the digital image:
  determining a content bounding box for the content on the page;
  segmenting the content within the content bounding box to generate a set of segments, each of the segments having a corresponding segment type according to a type of content in the segment;
  for each segment of the set of segments:
    determining a level of importance associated with the corresponding segment type, wherein the plurality of segment types comprises an image type and a text type;
    selecting a despeckling criteria for identifying the artifacts within the segment based at least in part on the level of importance associated with the segment, wherein a first despeckling criteria is selected if a low level of importance is associated with the segment and a second despeckling criteria is selected if a high level of importance is associated with the segment, wherein the second despeckling criteria is more conservative with respect to an artifact removal than the first despeckling criteria;
    identifying the artifacts within the segment according to the selected despeckling criteria; and
    removing the identified artifacts from the segment of the page; and
  storing an updated digital image in the content store.

10. A digital image processing system for processing the digital image to remove a plurality of artifacts from the digital image according to a type of content in which an artifact is found, the system comprising:

a processor;

a memory; and a content store storing a plurality of digital images of printed content, each digital image having at least one page of content;

wherein the system is configured to obtain the digital image to process, and for each page of content in the digital image:
  determine a content bounding box for the content on the page;
  segment the content within the bounding box on the page to generate a set of segments, each segment having one of a plurality of segment types determined according to the type of content in the segment;
  for each segment of the set of segments:
    determine a level of importance associated with a corresponding segment type, wherein the plurality of segment types comprises an image type and a text type;
    select despeckling criteria to identify the artifacts within the segment based at least in part on the level of importance associated with the corresponding segment type, wherein a first despeckling criteria is selected if a low level of importance is associated with the segment and a second despeckling criteria is selected if a high level of importance is associated with the segment, wherein the second despeckling criteria is more conservative with respect to an artifact removal than the first despeckling criteria;
    identify the artifacts within the segment according to the selected despeckling criteria; and
    remove the identified artifacts from the segment of the page; and store a processed digital image in the content store.

11. The digital image processing system of claim 10, wherein the plurality of segment types comprises at least one of a background segment, an image segment, a text region segment, or a text-line region segment.

12. The digital image processing system of claim 10, wherein the despeckling criteria for an image segment and a text region segment are distinct.

13. The digital image processing system of claim 10, wherein selecting despeckling criteria for identifying the artifacts with the segment comprises selecting a threshold count under which a plurality of connected pixels are removed.

14. The digital image processing system of claim 13, wherein the connected pixels are identified according to a connected component algorithm.

15. The method of claim 5, wherein the plurality of segment types comprises a text region segment and a text lines segment.

16. The method of claim 15, wherein the plurality of segment types further comprises an inter-word text segment and an inter-character text segment.

17. The method of claim 15, wherein the plurality of segment types further comprises an inter-regional segment that falls outside of the text lines segment.

18. The method of claim 5, wherein the selected despeckling criteria corresponds to a filter threshold.

19. The system of claim 10, wherein the selected despeckling criteria corresponds to a filter threshold.

* * * * *